(12) United States Patent
Ray

(10) Patent No.: US 9,951,967 B2
(45) Date of Patent: Apr. 24, 2018

(54) THERMAL ENERGY STORAGE SYSTEMS AND METHODS FOR USE WITH SOLAR POWER GENERATION SYSTEMS

(71) Applicant: JOHNS MANVILLE, Denver, CO (US)

(72) Inventor: Bruce Ray, Centennial, CO (US)

(73) Assignee: Johns Manville, Denver, CO (US)

( * ) Notice: Subject to any disclaimer, the term of this patent is extended or adjusted under 35 U.S.C. 154(b) by 281 days.

(21) Appl. No.: 15/054,875

(22) Filed: Feb. 26, 2016

(65) Prior Publication Data

US 2017/0248338 A1    Aug. 31, 2017

(51) Int. Cl.
| | |
|---|---|
| *G01M 1/38* | (2006.01) |
| *F24F 11/00* | (2018.01) |
| *G05B 19/048* | (2006.01) |
| *G05B 11/01* | (2006.01) |
| *F24F 5/00* | (2006.01) |

(52) U.S. Cl.
CPC ........ *F24F 11/0086* (2013.01); *F24F 5/0017* (2013.01); *F24F 11/006* (2013.01); *G05B 11/01* (2013.01); *G05B 19/048* (2013.01); *F24F 2005/0064* (2013.01); *F24F 2011/0061* (2013.01); *F24F 2011/0071* (2013.01); *F24F 2011/0075* (2013.01); *F24F 2011/0091* (2013.01); *G05B 2219/2614* (2013.01); *Y02E 60/147* (2013.01); *Y02E 70/30* (2013.01)

(58) Field of Classification Search
CPC ................. F24F 11/006; F24F 11/0086; F24F 2005/0064; F24F 2011/0061; F24F 2011/0071; F24F 2011/0075; F24F 2011/0091; F24F 5/0017; G05B 11/01; G05B 19/048; G05B 2219/2614; Y02E 60/147; Y02E 70/30
See application file for complete search history.

(56) References Cited

U.S. PATENT DOCUMENTS

| | | |
|---|---|---|
| 2013/0190940 A1 | 7/2013 | Sloop et al. |
| 2014/0067142 A1 | 3/2014 | Steven et al. |
| 2014/0277769 A1 | 9/2014 | Matsuoka et al. |

FOREIGN PATENT DOCUMENTS

| | | |
|---|---|---|
| DE | 102007004653 A1 | 7/2008 |

OTHER PUBLICATIONS

California Independent System Operator. *Fast Facts: What the duck curve tells us about managing a green grid.* Folsom, CA: California ISO, Oct. 2013. Print.

(Continued)

*Primary Examiner* — Robert Bachner
(74) *Attorney, Agent, or Firm* — Robert D. Touslee

(57) ABSTRACT

Various arrangements are provided related to thermal energy coordination systems. A thermal energy coordination system may analyze solar irradiance measurements to identify an overgeneration solar energy event. The system may activate a thermal energy storage event to coincide with the overgeneration solar energy event at the plurality of solar panels. The system, which can include many network-enabled smart thermostats, may control air conditioners or other HVAC system within various structures. The system may determine a time to initiate cooling and a temperature to which to cool the structure based upon the received indication of the thermal energy storage event. Cooling may be initiated by the system based on the determined time and the determined temperature in response to the received indication of the thermal energy storage event

20 Claims, 10 Drawing Sheets

(56) References Cited

OTHER PUBLICATIONS

Arora, M., et al., *Residential demand response from PV panel and energy storage device.* Power Electronics (IICPE), 2014 IEEE 6$^{th}$ India Int'l Conference, Dec. 10, 2014: National Institute of Technology, Kurukshetra, India.

THERMAL ENERGY STORAGE SYSTEMS AND METHODS FOR USE WITH SOLAR POWER GENERATION SYSTEMS

BACKGROUND

Peak demand events, including steep ramps, on an electrical grid have significant effects. Electricity providers must have sufficient capacity to deal with daily peak demand events, which typically occur around 6-8 PM. To handle such peak demand events, an electricity service provider may need to use one or more power sources to meet the demand that are less efficient but can be activated quickly, such as natural gas power plants. Further, a peak demand event may place a significant strain on an electrical grid, possibly causing component failure. If the electrical grid experiences less demand during a peak demand event, fewer power sources may need to be activated or, possibly, built and the strain on the electrical grid as well as power source emissions may be reduced.

SUMMARY

Various systems and methods related to thermal energy storage systems are presented.

In some embodiments of such a system, a plurality of pyranometers are present. The plurality of pyranometers are physically distributed in a vicinity of a plurality of solar panels, the plurality of pyranometers supplying a thermal energy coordination system with a plurality of solar irradiance measurements. The system may include the thermal energy coordination system. The thermal energy coordination system may be configured to receive the plurality of solar irradiance measurements. The thermal energy coordination system may be configured to analyze the plurality of solar irradiance measurements to predict an overgeneration solar energy event. The thermal energy coordination system may be configured to activate, to coincide with the overgeneration solar energy event at the plurality of solar panels, a thermal energy storage event, The thermal energy coordination system may be configured to transmit, to at least a subset of a plurality of network-enabled smart thermostats, the indication of the thermal energy storage event in response to activating the thermal energy storage event. The thermal energy storage system may include the plurality of network-enabled smart thermostats installed at a plurality of structures. Each network-enabled smart thermostat of the plurality of network-enabled smart thermostats may be configured to: control an air conditioner within a structure in which the network-enabled smart thermostat is installed based upon a measured temperature and a setpoint temperature; determine a time to initiate cooling and a temperature to which to cool the structure based upon the received indication of the thermal energy storage event; and initiate cooling by the air conditioner based on the determined time and the determined temperature in response to the received indication of the thermal energy storage event.

Embodiments of such a system may include one or more of the following features: The thermal energy coordination system may be configured to predict a time period during which the overgeneration solar energy event will occur at least partially based on the plurality of solar irradiance measurements, wherein the indication of the thermal energy storage event indicates the time. Electricity generated by the plurality of solar panels may be used to directly power air conditioners controlled by the plurality of network-enabled smart thermostats without using a battery charged by one or more solar panels of the plurality of solar panels for storage of the electricity. Each network-enabled smart thermostat of the plurality of network-enabled smart thermostats may be further configured to transmit a thermal mass value to the thermal energy coordination system such that the thermal energy coordination system receives a plurality of thermal mass values from the plurality of network-enabled smart thermostats. The thermal energy coordination system may be configured to select the subset of the plurality of network-enabled smart thermostats based on the plurality of thermal mass values. The thermal energy storage event may indicate a time period during which an amount of energy used for cooling by the subset of the plurality of network-enabled smart thermostats is to be decreased. Each network-enabled smart thermostat of the plurality of network-enabled smart thermostats may be configured to: decrease a runtime of the air conditioner controlled by the network-enabled smart thermostat during the time period. Each network-enabled smart thermostat of the plurality of network-enabled smart thermostats may be further configured to cease activating the air conditioner controlled by the network-enabled smart thermostat during the time period.

Additionally or alternatively, embodiments of such a system may include one or more of the following features: The plurality of solar panels may include: a first subset of solar panels located at a grid-level solar facility and a second subset of solar panels that are distributed at a subset of the plurality of structures. The thermal energy coordination system may be configured to activate the thermal energy storage event is based on a difference between electricity generation by the plurality of solar panels and a grid electrical load. The thermal energy coordination system may be configured to receive, from each network-enabled smart thermostat of a superset of network-enabled smart thermostats that comprises the plurality of network-enabled smart thermostats, a thermal mass value for the structure at which the network-enabled smart thermostat is installed, such that the thermal energy coordination system receives a plurality of thermal mass values from the superset of network-enabled smart thermostats. The thermal energy coordination system may be configured to select the plurality of network-enabled smart thermostats from the superset as eligible to participate as part of the thermal energy storage system based on the received plurality of thermal mass values.

In some embodiments, a method for using a thermal energy coordination server system is presented. The method may include identifying, by the thermal energy coordination server system, a power overgeneration event that includes power overgeneration due at least in part to power generated by a plurality of solar panels. The method may include predicting, by the thermal energy coordination server system, a peak demand event expected to occur on a same day as the power overgeneration event. The method may include activating a thermal energy storage event in response to the power overgeneration event and the peak demand event expected to occur on the same day. The method may include transmitting, by the thermal energy coordination server system, to at least a subset of a plurality of network-enabled smart thermostats, an indication of the thermal energy storage event in response to activating the thermal energy storage event, wherein the thermal energy storage event comprises an indication of a first time period of the power overgeneration event and an indication a second time period of the peak demand event.

Embodiments of such a method may include one or more of the following features: The method may include determining, by each network-enabled smart thermostat of the plurality of network-enabled smart thermostats, a time to initiate cooling and a temperature to which to cool an associated structure based upon thermal energy storage event. The method may include initiating, by each network-enabled smart thermostat of the plurality of network-enabled smart thermostats, cooling based on the determined time and the determined temperature in response to the received indication of the thermal energy storage event. Identifying the power overgeneration event may include analyzing, by the thermal energy coordination server system, a plurality of solar irradiance measurements to determine the first time period during which the power overgeneration event will occur. The method may include receiving, by the thermal energy coordination server system, from each network-enabled smart thermostat of the plurality of network-enabled smart thermostats, a thermal mass value such that the thermal energy coordination server system receives a plurality of thermal mass values from the plurality of network-enabled smart thermostats. The method may include selecting, by the thermal energy coordination server system, the subset of the plurality of network-enabled smart thermostats based on the plurality of thermal mass values. The method may include ceasing, by each network-enabled smart thermostat of at least the subset of the plurality of network-enabled smart thermostats, to activate an air conditioner controlled by the network-enabled smart thermostat during the second time period of the peak demand event. Identifying the power overgeneration event may include determining a difference between predicted electricity generation and a grid electrical load. The method may include receiving, from each network-enabled smart thermostat of a superset of network-enabled smart thermostats, a thermal mass value for a structure at which the network-enabled smart thermostat is installed, such that the thermal energy coordination server system receives a plurality of thermal mass values from the superset of network-enabled smart thermostats. The method may include selecting, by the thermal energy coordination server system, the plurality of network-enabled smart thermostats from the superset as eligible to participate as part of the thermal energy coordination server system based on the received plurality of thermal mass values.

In some embodiments, a non-transitory processor-readable medium comprising processor-readable instructions is presented. The instructions may cause the one or more processors to identify a power overgeneration event expected to occur that includes power overgeneration due at least in part to power generated by a plurality of solar panels, The instructions may cause the one or more processors to predict a peak demand event expected to occur later on a same day as the power overgeneration event, The instructions may cause the one or more processors to activate a thermal energy storage event in response to the power overgeneration event and the peak demand event expected to occur on the same day. The instructions may cause the one or more processors to transmit to a subset of a plurality of network-enabled smart thermostats, an indication of the thermal energy storage event in response to activating the thermal energy storage event, wherein the thermal energy storage event comprises an indication of a first time period of the power overgeneration event and an indication a second time period of the peak demand event.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
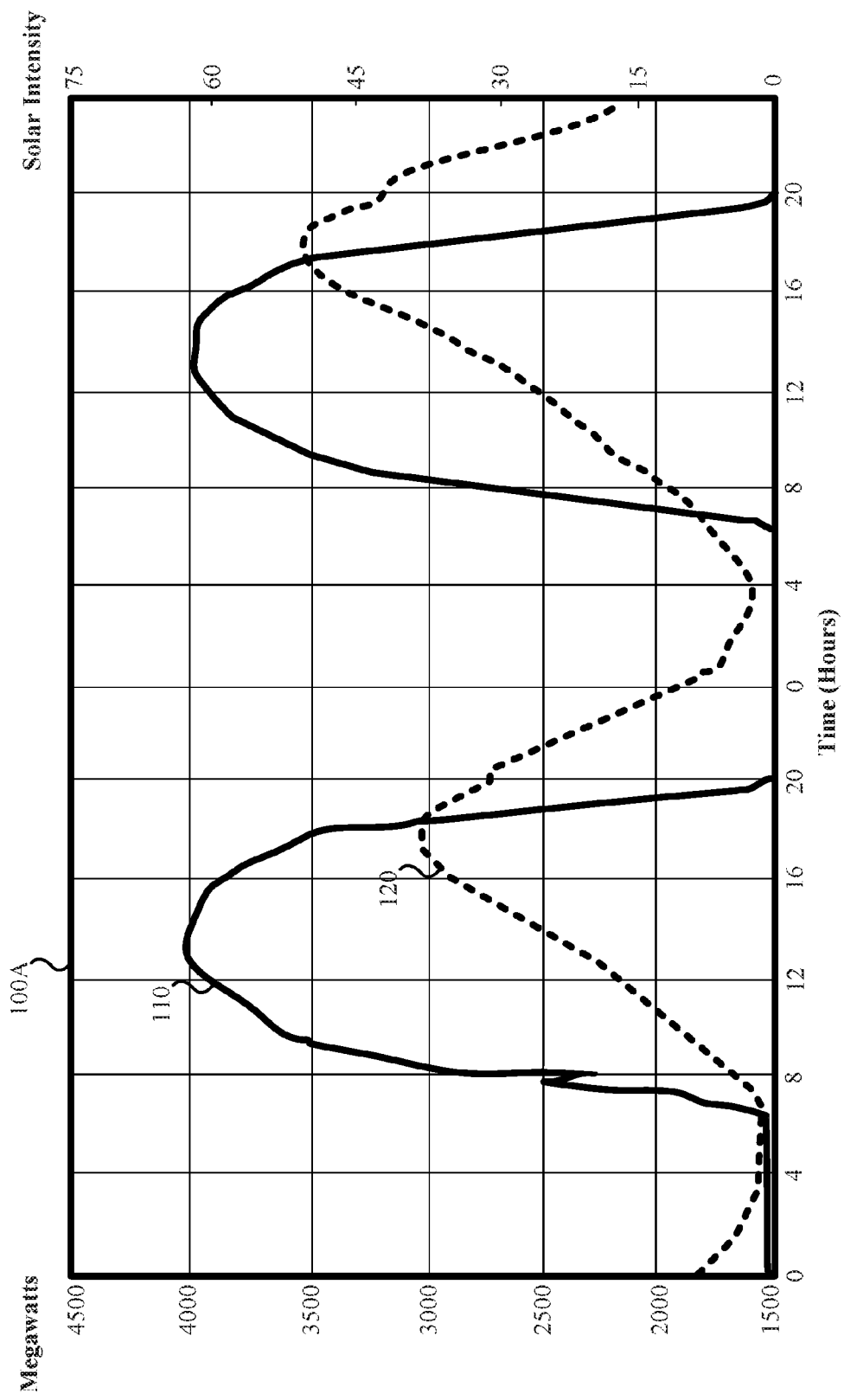
FIG. 1A illustrates a graph of an example of solar output and typical load for an electrical grid.

Many homes, apartment buildings, offices, warehouses, and businesses (collectively referred to as "structures") have solar panels installed to generate electricity. Such electricity can be used locally at the structure or can be output onto a utility's electrical grid for use at other locations. Also, utilities may operate or purchase electricity from large-scale solar farms, which are usually located a significant distance from the structures that are supplied with the generated electricity. While a significant amount of electricity is generated by solar panels on sunny days, generation of such solar energy is only useful if there is sufficient demand being placed on the electrical grid, especially if energy storage devices (e.g., grid-level or structure-level batteries) are not deployed or used.

Solar intensity, the amount of energy being received from the sun, typically peaks several hours before peak demand occurs on an electrical grid. The amount of solar energy being converted to electricity peaks with solar intensity but demand will likely not peak until several hours later, such as during a daily peak demand event occurring between 6-8 PM. Therefore, in order to increase the usefulness of electricity being generated by solar panels, it would be useful to store such generated electricity until the time period when peak demand is occurring. Peak demand is especially concerning due to power suppliers needing to construct power generation sources simply to meet worst-case peak demand. For instance, a natural gas powered plant may be constructed to handle a peak demand event that only occurs in the summer for several hours during the week. Avoiding the building of such facilities—and their accompanying emissions—may be accomplished via the systems and methods discussed herein. Energy storage, as used in this document, is defined as: the reception or absorption of energy (the "charging" of the distributed energy storage device), the energy being stored for a period of time, and thereafter the stored energy being used or released (the "discharging" of the distributed energy storage device). Such storage can be used as a form of demand response by decreasing demand upon an electrical grid during the time of peak demand.

While electricity can be stored directly by devices such as batteries or capacitors, electricity generated using solar panels may be stored indirectly in another form. One type of indirect storage of electricity is thermal storage. Thermal storage performed for a structure may involve heating or cooling the interior environment of the structure. Since air conditioning consumes a significant amount of electricity and the use of air conditioning tends to coincide with days of high solar intensity (and the associated high environmental temperatures), air conditioning represents a candidate for use in performing thermal energy storage. Further, such distributed thermal energy storage may have significant benefits over grid-level batteries or capacitors clustered in single or limited locations. Thus, cost may be significantly lower and batteries and capacitors run a risk of overheating and/or exploding. Such distributed energy storage significantly increases the number of storage locations ensuring that an adverse impact to any single location does not affect the capacity or usefulness of the energy storage system. Such energy storage also avoids the hazardous materials or expensive metals associated with some existing energy storage systems and devices.

When excess electricity is generated by solar panels, such energy may be converted to thermal energy by pre-cooling the interior environment of a structure in anticipation of a demand response situation occurring in the near-term future (e.g., within 5 hours). Such cooling may involve cooling the structure early compared to a temperature setpoint defined by a user and/or cooling the structure to a lower temperature than requested by the user. For instance, if a user has set his smart thermostat to have his home cooled to 75 degrees Fahrenheit by 8 PM, a pre-cooling arrangement may bring the temperature of the home to the desired temperature earlier than 8 PM and/or may cool the structure to several (e.g., 2, 5, 10) degrees below 75 degrees Fahrenheit. If peak demand of electricity usage occurs at around 8 PM on the electrical grid, by precooling the structure to decrease or eliminate the usage of the air conditioner during the time around peak usage, the structure has effectively stored electricity as thermal energy to decrease peak electricity usage.

The ability of a structure to store thermal energy is at least partially dependent on how well the structure can maintain a temperature differential between the structure's interior and the exterior environment. The greater a structure is insulated, the more effective the structure will be at storing thermal energy, and, thus, the higher the structure's thermal mass. In some situations, if a structure is sufficiently insulated, it may be possible for the structure to be precooled (by starting cooling earlier than needed and/or by cooling to a lower temperature) such that a time period coinciding with a peak demand event can be fully avoided from having the air conditioner turned on. The better insulated a structure is, the longer that energy can be effectively stored by the structure (loss is decreased). Further, during the demand response event, when an air conditioner is to be activated less often, comfort may be maintained longer because the increased insulation helps prevent the interior temperature from rising rapidly.

The control of such a system may be based on measured or predicted solar intensity for a given day at locations where solar panels are located. Real time measurements, models, and/or predictions of the amount of electricity available to be generated and thermally stored (e.g., not needed immediately on the grid or locally at a structure) may be determined. If greater than a threshold amount of solar-generated electricity is available for thermal storage, a structure-based thermal mass storage system may be engaged that relies on precooling many structures by initiating cooling early (e.g., earlier than requested by a user) and/or cooling the structure to a lower temperature than set by a user. Such an arrangement may be enabled by network-based communication with "smart" thermostats, such as the Nest® Learning Thermostat. By storing the excess solar energy from earlier in the day as thermal energy, the use of other forms of energy storage may be reduced or eliminated. For example, such a thermal energy storage system may help avoid the use of grid-level or structure-level batteries.

While the following description focuses on solar energy as the source for preheating and precooling structures, it should be understood that in various embodiments, the power source that contributes to overgeneration of power may be other than a solar source. For instance, wind energy may tend to peak during the night. Systems and method as detailed below may be adapted to preheat or precool structures during a different timeframe based on overgeneration of power by an alternate power source, such as a wind farm.

FIG. 1A illustrates a graph 100A of solar output and a typical daily load on an electrical grid. On graph 100A, the solar output of one or more solar-based power production facilities, at least on a clear day, roughly resembles a bell curve. Line 110 represents the megawatt output of an exemplary solar power production facility. Maximum output is reached around noon and begins to significantly drop off around 4 PM. Line 120 represents an exemplary grid-wide load which the exemplary solar-based power production facility may supply with power. The load ramps up at almost a linear rate through the day, peaking approximately at 6 PM and remaining substantially elevated until after 8 PM. During this time period of 6 PM to 9 PM, the power generated by the exemplary solar-based power production facility has decreased substantially due to the setting sun.

While graph 100A is exemplary, it is common for an electrical grid to experience peak demand between 6 PM and 9 PM (referred to as a "peak demand event"). Further, it is common for power generated by solar panels, whether installed at a structure or at a dedicated solar power generation facility, to reach a daily maximum output ("peak solar generation event") 3-6 hours earlier than the peak demand event. Since the peak solar generation event does not coincide with the peak demand event, other power sources are typically used to provide power during the peak demand event, such as oil, natural gas, or diesel power plants, which can be relatively quickly brought online to begin power generation.

Since a daily peak solar generation event does not coincide with the day's later peak demand event, the electricity generated using solar power must be stored if it is going to be used during the peak demand event. One possible way of storing such power is using large-scale or distributed batteries and/or capacitors. However, such an approach can require new and expensive specialized equipment. Rather, HVAC equipment already connected with the electrical grid may be used to store such solar energy as thermal energy in individual structures. By storing the energy of electricity generated during the peak solar generation event as thermal energy, energy savings can then be realized during the peak demand event that occurs at least a few hours later in the day, effectively storing the solar-generated electricity.

Figure 1B:
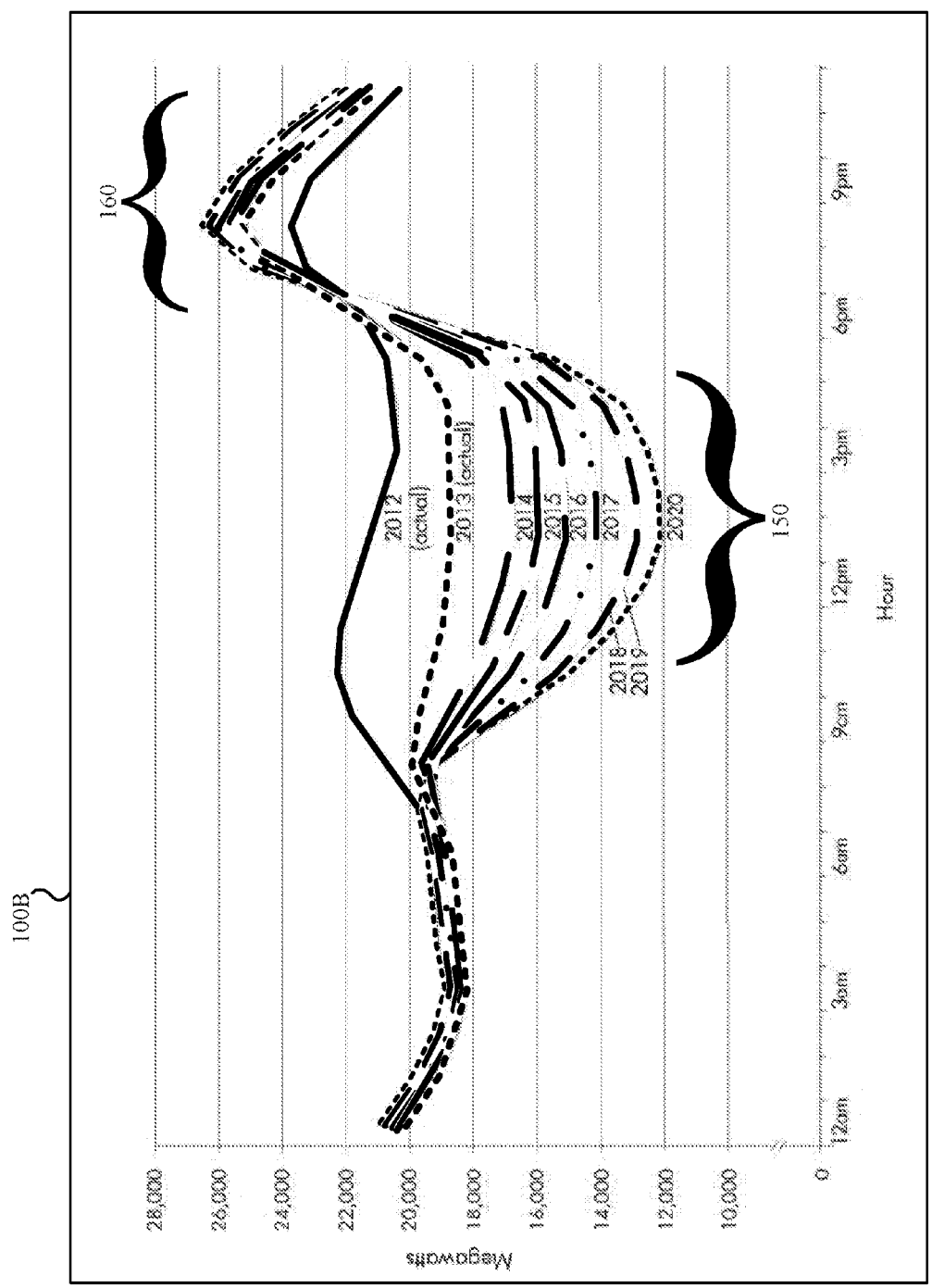
FIG. 1B illustrates a graph of an example of grid-level demand and time for an electrical grid.

FIG. 1B illustrates graph 100B, which represents an example of grid-level demand against time for an exemplary electrical grid. In graph 100B, a grid's demand is graphed on the y-axis against time on the x-axis. Lines are present for various years, including some years for which actual data is available (2012, 2013) and predictions for later years (2014-2020). During the approximate timeframe of 10 AM until 6:30 PM, demand (net load) is decreased, especially as forecast in years 2014 through 2020, due in large part to a significant amount of electricity being generated by solar panels. The electricity being generated by solar panels, including those directly connected to structures' electrical systems, decreases the amount of demand on other sources present on the electrical grid, resulting in possible overgeneration of electricity during time period 150.

Some power sources, such as coal and nuclear are typically thought of as "baseload" power sources that output a roughly consistent amount of power over time. Such power sources are inefficient to quickly be brought online or offline. Therefore, despite solar panels producing a significant amount of power during time period 150, such baseline power sources may continue producing near-constant amount of power, thus resulting in possible overgeneration events during which more power is available than is being used on the grid, even if "peaker" power sources are offline.

Peaker power sources refer to power sources that can relatively quickly be brought online. Typically, a peaker power source is a natural gas powered power plant that can be brought online for a short time per day to help with peak demand events. The overgeneration events expected for years 2014-2020 during time period 150 can actually exacerbate the peak demand event of time period 160 by requiring a significant ramp up of power output in the 7-10 PM time window. For instance, in 2017-2020, a ramp-up of about 13,000 Megawatts in power generation may be necessary to supply the load on the electrical grid when transitioning from time period 150 to time period 160.

By using structures as energy storage devices as detailed in this document, the trough of graph 100B during time period 150 may be made less severe (by using additional power during an overgeneration event) and the peak of graph 100B during time period 160 may be made less severe (by reducing power usage during the peak demand event).

Figure 2:
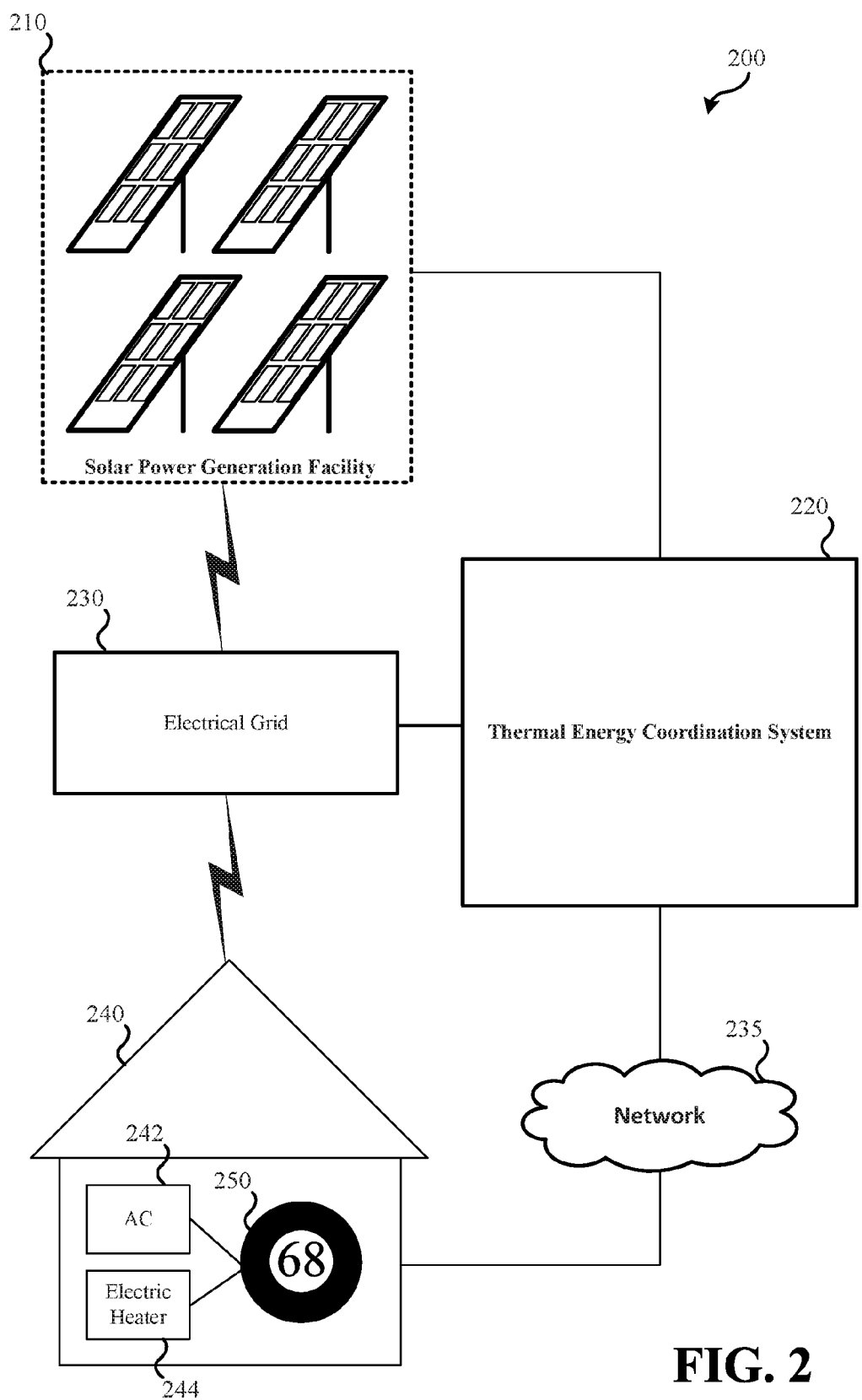
FIG. 2 illustrates an embodiment of a solar-powered thermal energy storage system.

FIG. 2 illustrates an embodiment of a solar-powered thermal energy storage system 200. Solar-powered thermal energy storage system 200 may allow electricity generated using solar panels (and/or other sources) to be stored as thermal energy at a distributed set of structures. While solar-powered thermal energy storage system 200 may allow electricity generated by solar panels to be stored as thermal energy at a structure, it should also be understood that electricity generated from other sources may be stored as thermal energy instead or in addition to thermal energy generated using electricity directly from solar panels. Overgeneration of electricity from sources other than solar panels may be due to the increased output of solar panels during a peak solar generation event being able to power a significant portion of an electrical grid's load.

Solar-powered thermal energy storage system 200 may include: solar power generation facility 210, thermal energy coordination system 220, electrical grid 230, network 235, network-enabled smart thermostat 250-1, air-conditioner 242, and electric heater 244. Solar power generation facility 210 may represent a dedicated power generation facility that generates electricity using many solar panels. Typically, such facilities are located a significant distance from the electrical load that such facilities power. Solar power generation facility 210 may experience a daily peak solar event where the power output of the facilities solar panels reaches a maximum and then decreases. Solar power generation facility 210 may provide electricity to electrical grid 230.

Electrical grid 230 may serve to distribute electricity from solar power generation facility 210 and, likely, multiple other power generation facilities to structures throughout a geographic region. To simplify FIG. 2, electrical grid 230 is represented as a block and is shown as connected with only a single structure 240. It should be understood that electrical grid 230, in a real-world environment, would be connected with tens of thousands of structures.

At structure 240, various systems may use electricity. Heating, ventilation, and air conditioning (HVAC) systems, if powered by electricity, tend to use a significant amount. For instance, when air-conditioning is being used, a structure's air-conditioner tends to be the largest or one of the largest power draws within the structure. Similarly, if electrical heating is being used, electrical heat can be the largest or one of the largest power draws within a structure. In FIG. 2, structure 240 has installed an electric air-conditioner 242 and an electric heater 244. It should be understood that in many arrangements, only one of air-conditioner 242 and electric heater 244 is present.

Network-enabled smart thermostat 250-1 may control activation of air-conditioner 242 and/or electric heater 244. Network-enabled smart thermostat 250-1 may be able to communicate with one or more remote computerized systems via an Internet connection represented by structure 240 being connected with network 235. Network-enabled smart thermostat 250-1 may be referred to herein as "smart" due to its ability (possibly in addition to learning the preferences and habits of the occupants) to communicate with remote computerized systems and process and execute commands, at least some of which may be received from such remote computerized systems. For basic functionality, network-enabled smart thermostat 250-1 has stored a setpoint temperature which is indicative of a temperature a user desires to be maintained within structure 240. In FIG. 2, network-enabled smart thermostat 250-1 is displaying a desired setpoint temperature of 68 degrees Fahrenheit. Network-enabled smart thermostat 250-1 may control air-conditioner 242 and/or electric heater 244 as necessary in order to at least approximately realize the setpoint temperature within the structure. Network-enabled smart thermostat 250-1 may have onboard one or more temperature sensors, one or more user interfaces, one or more processors, an electronic display, and a wired or wireless network interface to allow for wireless communication with a network access point.

While electric heater 244 may produce heat using electricity, solar-powered thermal energy storage system 200 may be functional with heating sources other than sources that directly produce heat from electricity. As an example, some gas and oil furnaces, especially older systems, may use an electric fan system that consumes a substantial amount of electricity. Despite such heating sources producing heat from a source other than electricity, the use of an accompanying electric device or system, such as an electric fan system, may consume a substantial enough amount of electricity that using such an alternate heating system as part of solar-powered thermal energy storage system 200 for preheating would be beneficial.

Thermal energy coordination system 220 may be in communication with solar power generation facility 210, electrical grid 230, and network-enabled smart thermostat 250-1. FIG. 2 depicts thermal energy coordination system 220 as being in direct communication with solar power generation facility 210 and communicating with network-enabled smart thermostat 250-1 via network 235. It should be understood that thermal energy coordination system 220 may use network 235, which can represent the Internet, to also communicate with electrical grid 230 and solar power generation facility 210.

Thermal energy coordination system 220 may include one or more computer systems that can coordinate transmission of one or more commands to network-enabled smart thermostat 250-1 in order to heat or cool an interior of structure 240 earlier and/or to a greater degree such that, at a later time, less demand will be placed on electrical grid 230 by such HVAC loads. For example, on a hot day, when a person returns from work, he may have set network-enabled smart thermostat 250-1 to cool structure 240 to 68° F. by setting a corresponding setpoint that is activated at, for example, 7 PM. If solar power generation facility 210 is outputting sufficient electricity that there is spare capacity detected, thermal energy coordination system 220 may cause network-enabled smart thermostat 250 to precool structure 240 (if the outdoor temperature is above the desired setpoint and the air conditioner is activated) or preheat structure 240 (if the outdoor temperature is below the desired setpoint and the heater is activated) earlier than a time defined by the user's setpoint. Additionally or alternatively, structure 240 may be heated or cooled to a greater extent than requested by the user setpoint. For example, if the outdoor temperature is above the desired setpoint, precooling may be performed to a lower temperature than 68° F. Alternatively, if the outdoor temperature is below the desired setpoint, preheating may be performed to a higher temperature than 68° F. While the remainder of this document focuses on precooling a structure to serve as thermal energy storage, it should be understood that similar principles may be applied to preheating if the heating source is powered by or uses electricity.

Precooling structure 240, especially if well insulated, serves to store thermal energy which was created by air-conditioner 242 using electricity from electrical grid 230. Such electricity from electrical grid 230 may have been received from solar power generation facility 210 directly or may have been part of electricity generated by another electricity producing facility due, at least in part, to increased electricity production by solar power generation facility 210 resulting in overgeneration. By energy being stored in the form of thermal energy by structure 240, a future demand placed upon electrical grid 230 by network-enabled smart thermostat 250-1 may be decreased. For instance, since structure 240 has been precooled, during a later peak demand event, network-enabled smart thermostat 250-1 may activate air-conditioner 242 a decreased amount of time or not at all. In some embodiments, the air conditioner being activated such a decreased amount of time may be based on a command received from thermal energy coordination system 220.

Based on information received from solar power generation facility 210, electrical grid 230 (e.g., current load data information), weather predictions (e.g., predicted cloud cover information), and/or other measurements, thermal energy coordination system 220 may be able to determine when a likely overgeneration event is going to occur (that is, a time period during which excess electricity generation is going to be present due to solar panels converting a significant amount of solar energy to electricity). Once an overgeneration event is predicted or detected, thermal energy coordination system 220 may initiate a thermal energy storage event and send an indication of such an event to various network-enabled smart thermostats such as network-enabled smart thermostat 250-1. Based on received indications of the thermal energy storage event, dozens, hundreds, or thousands of network-enabled smart thermostats may precool structures in which such thermostats are installed ahead of a demand event that is expected to be present on electrical grid 230. By such a large number of structures being precooled, the demand placed for electricity on electrical grid 230 by such structures during the later peak demand event may be decreased significantly. By precooling such structures, electricity is effectively used to "charge" the structures, which enables such structures to serve as energy storage devices. The energy is stored by such structures as thermal energy until the demand response event. During the demand response event, the thermal energy is then "discharged" by keeping the structure cool and decreasing the amount of time that an air conditioner (and, possibly, fan system) is activated during the peak demand event. By precooling the structure during an overgeneration time period, the structures effectively become energy storage devices.

Of note, in solar-powered thermal energy storage system 200, batteries and/or capacitors may not be used to store electricity. That is, power generated by solar power generation facility 210 may not be stored in either a structure level or grid level battery until such electricity is desired to be used. Since such batteries may not be installed, cost effective, or otherwise available storage of electricity generated during a solar overgeneration event may be stored as thermal energy within multiple structures.

Figure 3:
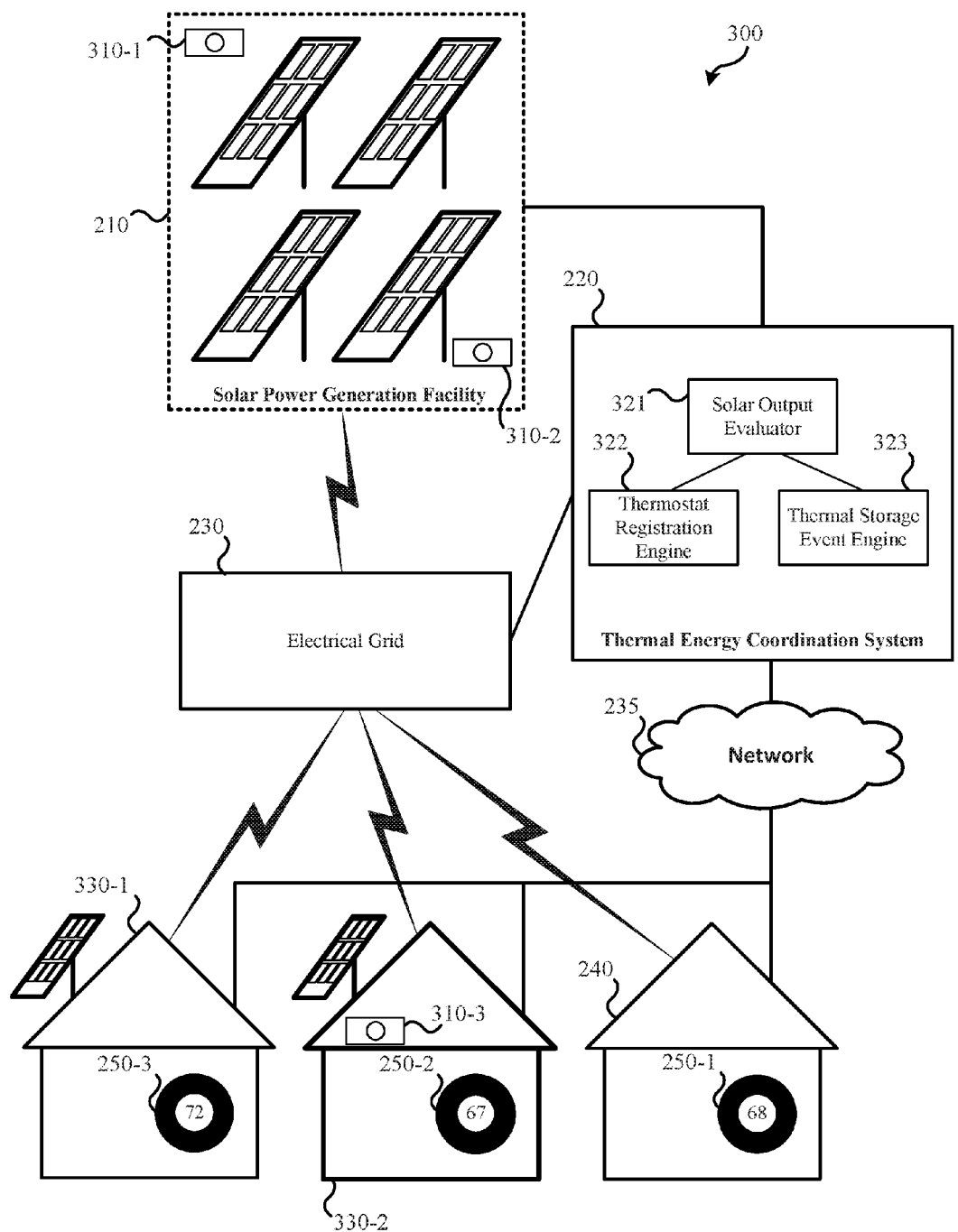
FIG. 3 illustrates another embodiment of a solar-powered thermal energy storage system that includes distributed solar panels.

FIG. 3 illustrates an embodiment of a solar-powered thermal energy storage system 300 that includes distributed solar panels. Solar-powered thermal energy storage system 300 represents an alternate or more detailed embodiment of solar-powered thermal energy storage system 200. In solar powered thermal energy storage system 300, in addition the solar panels being present at solar power generation facility 210, some solar panels or distributed at structures, such as structure 330-1 and structure 330-2. Solar panels located at a structure, such as structure 330-1, may directly power electrical devices at such structures if the demand is present. If demand is not present, electricity may be transferred from such structures to electrical grid 230. Electricity generated by the distributed solar panels including the solar panels at structures and at solar power generation facility 210 may be stored as thermal energy at one or more structures as cooled air.

Multiple pyranometers may be installed in the vicinity of solar panels in order to determine an amount of solar radiance incident on such solar panels. For instance, pyranometers may be distributed at solar power generation facility, such as pyranometer 310-1 and pyranometer 310-2 and may also be distributed near solar panels installed at structures such as pyranometer 310-3. In some situations, pyranometers or similar equipment may be installed in the path weather usually travels towards such solar panels, thus allowing predictions to be made on the amount of solar energy that will be converted to electricity. Such pyranometers may be in communication with thermal energy coordination system 220 via network 235 or direct communication to allow thermal energy coordination system 220 to evaluate measurements of solar irradiance to determine or predict overgeneration events due at least in part to solar energy production.

In some embodiments, in addition to or alternatively to receiving measurements from various pyranometers, thermal energy coordination system 220 may use data from other sources to determine whether an overgeneration event is in progress or is predicted. Such other sources may include measurements of the output voltage or output power from any of the solar panels and weather forecasts. Data may additionally be gathered from electrical grid 230 which may indicate the current load being placed on the grid. Such data may provide information about specific sub grids within electrical grid 230. For instance, even if an overall load is low on electrical grid 230, a sub grid that is part of electrical grid 230 may be experiencing a high load and thus, it may not be advisable to initiate a thermal energy storage event that involves placing additional strain on the highly-loaded sub-grid.

Thermal energy coordination system may have distinct components including: solar output evaluator 321, thermostat registration engine 322, and thermal storage event engine 323. Such components may be implemented using one or more computerized systems. Solar output evaluator 321 may use measurements from pyranometers 310, voltage or power outputs from solar panels located at solar power generation facility 210 and/or distributed solar panels located at structures 330, weather forecasts, and/or any other available data used to forecast or identify the amount of electricity being generated by solar panels. Thermal storage event engine 323 may be analyzing data received from solar output evaluator 321 in combination with current conditions or predicted conditions on electrical grid 230 in order to assess whether an overgeneration event is present or predicted, whether a demand event is predicted for later in the day, and whether a thermal storage event is advisable to implement. If advisable to implement, thermal storage event engine 323 may alert some number of network-enabled smart thermostats 250 to initiate a thermal storage event.

Thermostat registration engine 322 may serve to register network-enabled smart thermostats 250 to participate in thermal energy storage events. First, thermostat registration engine 322 may evaluate whether a particular network-enabled smart thermostat is eligible to participate, such as based on a thermal mass of the structure in which the thermostat is installed. Such a thermal mass may be determined based on location by the smart thermostat using information including: air conditioner runtime, inside temperature measurements, and outside temperature. Thermostat registration engine 322 may only permit network-enabled smart thermostats to participate in a thermal storage event if the corresponding structure has at least a particular thermal mass. Thermal mass of a structure may be increased by addition of better and/or more insulation. Additionally or alternatively, even if a smart thermostat is eligible to register for inclusion in a thermal energy storage event, more smart thermostats may be registered that are permitted to participate in a given event, such as based on the amount of excess electricity generated directly or indirectly by solar panels. In such a situation, smart thermostats associated with structures that have the highest thermal mass may be selected for participation. Therefore, if the owner of a structure desires for his structure to participate frequently in thermal energy storage events, the structure's thermal mass should be increased to a higher amount than other structures that are also eligible to participate.

Figure 4:
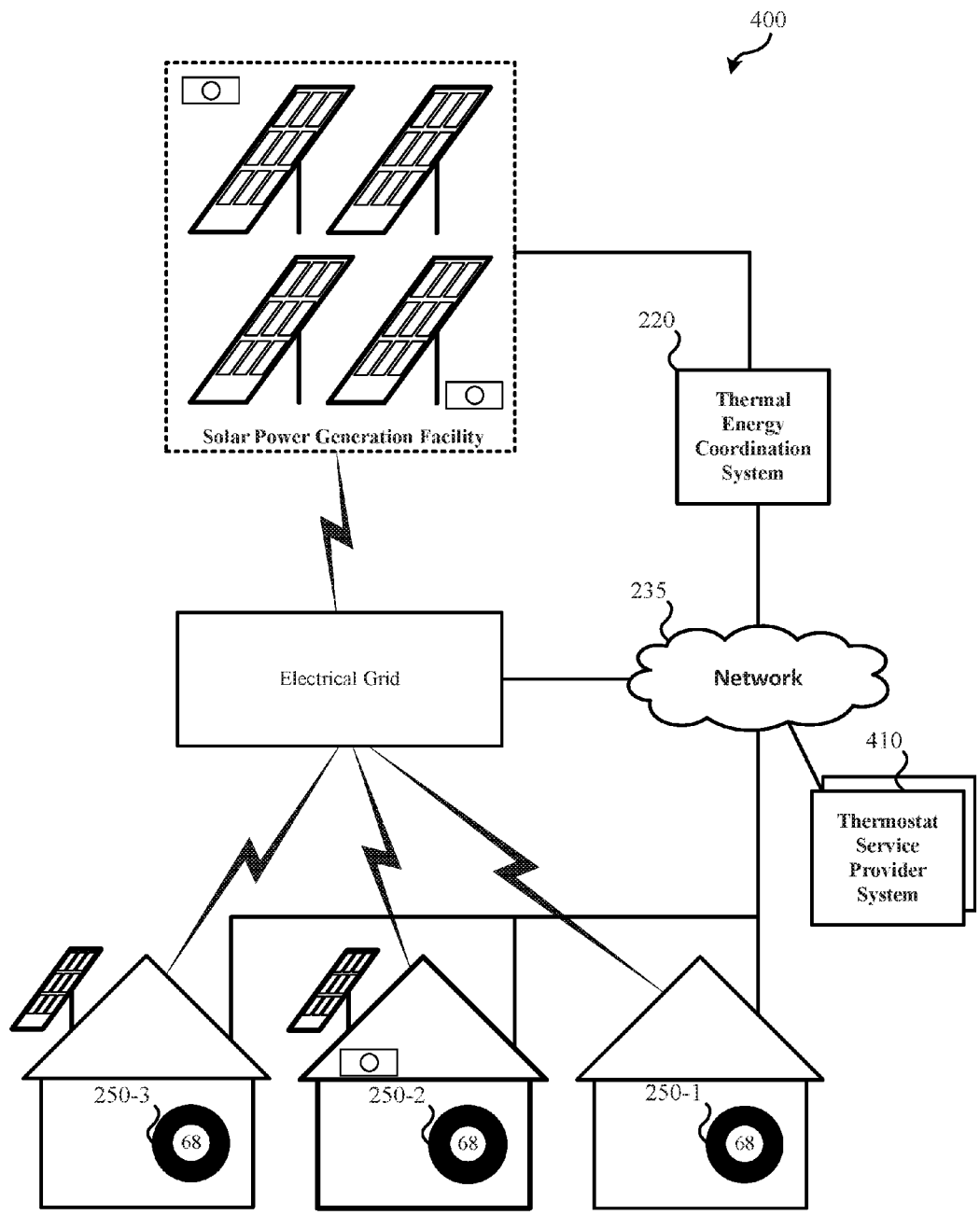
FIG. 4 illustrates another embodiment of a solar-powered thermal energy storage system that uses a third-party platform to manage communication with network-enabled smart thermostats.

FIG. 4 illustrates another embodiment of a solar-powered thermal energy storage system 400 that uses a third-party platform to manage communication with network-enabled smart thermostats. Solar-powered thermal energy storage system 400 represents an alternate or more detailed embodiment of solar-powered thermal energy storage system 300. Network-enabled smart thermostats may be configured such that they can only communicate via network 235 with thermostat service provider system 410. For example, thermostat service provider system 410 may be a manufacturer that sells network-enabled smart thermostats. In order to preserve security around privacy-sensitive data, network-enabled smart thermostats 250 may be configured to only communicate with thermostat service provider system 410. Smart thermostats manufactured or distributed by another service provider may similarly only communicate with the corresponding thermostat service provider.

In such embodiments, rather than communicating directly with network-enabled smart thermostats 250, thermal energy coordination system 220 may communicate with thermostat service provider system 410 (and, possibly one or more other thermostat service providers that handle communication with other smart thermostats). When thermal energy coordination system 220 is initiating a thermal energy storage event, an indication of the thermal energy storage event and, possibly, the particular network-enabled smart thermostats that are to participate in the thermal energy storage event, may be transmitted to thermostat service provider system 410 in a message or series of messages. Such a message may indicate: a time period corresponding to a solar overgeneration event, a time period corresponding to a peak demand event, and an identifier of the one or more smart thermostats to participate in the thermal storage event. In such embodiments, thermostat service provider system 410 may host one or more of the components of thermal energy coordination system, such as thermostat registration engine 322.

In FIGS. 3 and 4, electric air conditioning units and electric heaters are not illustrated for simplicity of the drawings. It should be understood that each of network-enabled smart thermostats 250 control at least one of an air conditioner and an electric heater. If only an air conditioner is controlled by a smart thermostat, that structure and smart thermostat is eligible to participate in only precooling-based thermal energy storage events. If only an electric heater is controlled by a smart thermostat, that structure and smart thermostat is eligible to participate in only preheating-based thermal energy storage events.

Figure 5:
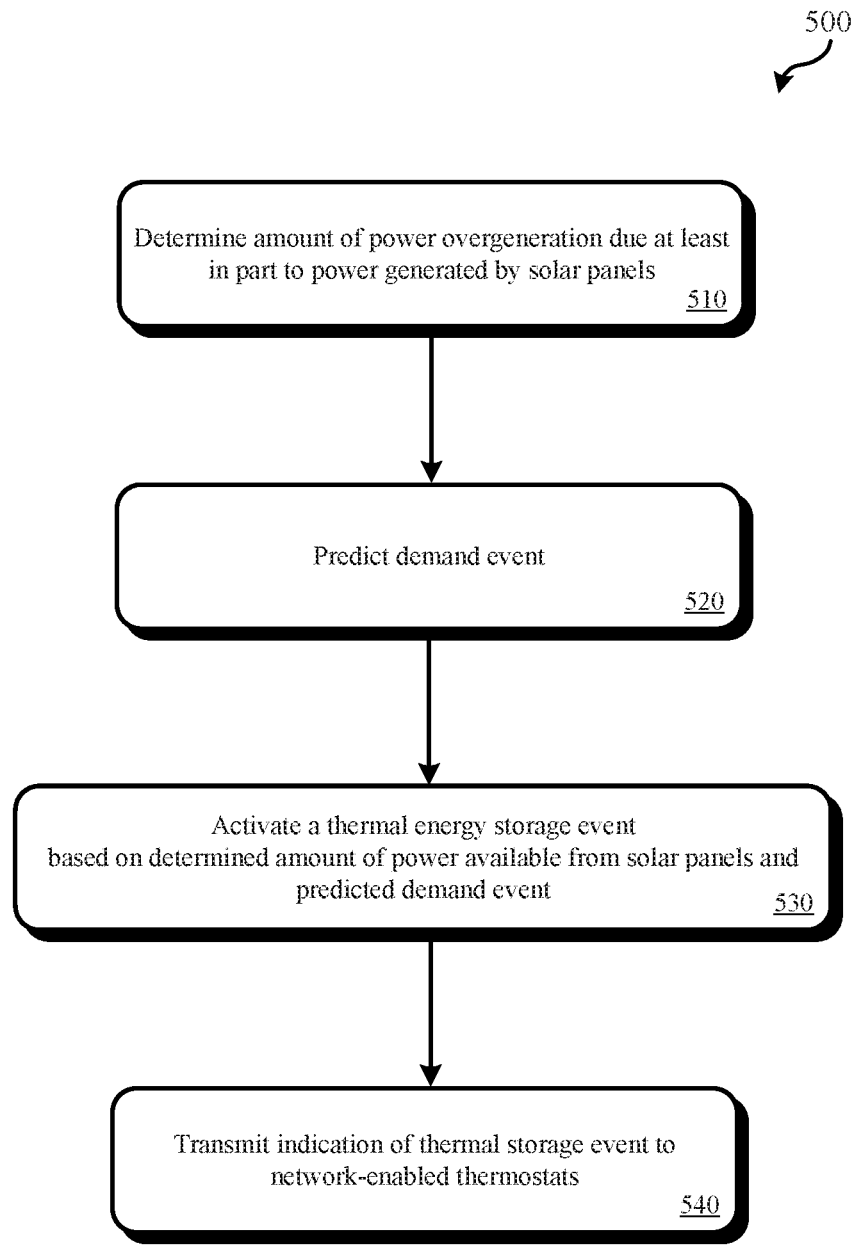
FIG. 5 illustrates an embodiment of a method for using a thermal energy storage system.

Various methods for using the systems of FIGS. 2-4 may be used to perform a thermal energy storage event that uses electricity generated during overgeneration that results directly or indirectly from a daily solar peak event to help alleviate demand during a peak demand event occurring later the same day. The methods of FIGS. 5-8 may be performed using the systems of FIGS. 2-4. It should be understood that such methods may also be performed using other systems that provide for temporary thermal energy storage. FIG. 5 illustrates a method 500 for using a thermal energy storage system. Each step of method 500 may be performed by a thermal energy coordination system, such as thermal energy coordination system 220 of FIG. 3.

At block 510, an amount of power generated during an overgeneration event by or otherwise resulting from solar panels may be identified or predicted. The amount of overgeneration power may include power generated at one or more solar power generation facilities and/or power generated using solar panels located at one or more structures. The amount of power that is to be generated by the solar panel installations over a period of time may be predicted based on: the time of the day, weather forecasts, historical data, solar intensity measurements, and voltage/power outputs from such solar panel installations. Rather than prediction, real-time measurements of power being generated by solar panel installations may be used, such as based on solar intensity measurements and voltage/power outputs from such solar panel installations. To identify how much of the power generated is considered overgeneration, the total available power output of sources of the electrical grid may be compared with the current or predicted load on the electrical grid. The difference between the load and the total available power represents the overgeneration power. This overgeneration power can be entirely or significantly attributed to the power generated by the solar panel installations during the peak solar event because the amount of power generated by many other power sources (e.g., natural gas, oil, nuclear, and coal) tend to remain fairly consistent, while the amount of power generated by solar panels greatly spikes during the hours of peak solar intensity. Therefore, during these hours, a significant amount of overgeneration power attributed to the increase in solar power electricity production may be present.

At block 520, a demand event may be predicted. The demand event may typically occur between 1 and 5 hours after a peak solar event. The peak demand event may occur daily and may be predicted (in time of occurrence, duration, and in load spike) based on historical data, the weather (e.g., the temperature) and the day of the week (e.g., the peak demand event may be more pronounced on a weekday).

At block 530, a thermal energy storage event may be activated. The thermal energy storage event may be activated based on the demand event being predicted at block 520 and the determined amount of overgeneration power due to the use of solar panel installations at block 510. In some embodiments, the thermal energy storage event is only activated if the demand event predicted at block 520 is greater than a deferred minimum threshold. (That is, if the peak demand predicted for a day is below the threshold, it may not be efficient to activate the thermal energy storage event.) Activation at block 530 may include identifying and selecting a set of network-enabled smart thermostats at which to execute the thermal energy storage event by precooling a structure's interior: 1) ahead of the peak demand event, which may result in a user's defined temperature setpoint being executed by the thermostat earlier than requested by a user; and/or 2) cooling the structure's interior to a lower temperature than requested by a user's setpoint. By cooling the structure's interior to a lower temperature, the air conditioning at the structure may be activated less often such that a temperature in a vicinity of the user's desired setpoint is realized during the peak demand event. By cooling the structure's temperature early, power usage is shifted away from the peak demand event to instead coincide with the peak solar event.

At block 540, an indication of the thermal energy storage event may be transmitted to a set of network-enabled smart thermostats. In accordance with systems 200 and 300 of FIGS. 2 and 3, respectively, the thermal energy coordination system 220 may transmit this indication directly to various smart thermostats. Alternatively, in accordance with FIG. 4, thermal energy coordination system 220 may send the indication of the thermal energy storage event to one or more thermostat service provider systems, which may then format and relay appropriate instructions to network-enabled smart thermostats 250. The indication at block 540 may be a packetized message that includes all or a subset of the data indicated in the example of Table 1.

It should also be understood that other embodiments of such an indication of a thermal energy storage event may include additional data types and values.

TABLE 1

Exemplary Message of Initialization of Thermal Energy Storage Event

| Data Type | Exemplary Value |
| --- | --- |
| Network-Enabled Smart Thermostat Address | 2001:db8:a0b:12f0::1 |
| Thermal Storage Event Activation | Yes |
| Pre-heating/Pre-cooling | Pre-cooling |
| Overgeneration Event Start | 12:00 |
| Overgeneration Event End | 16:00 |
| Peak Demand Event Start | 17:00 |
| Peak Demand Event End | 21:00 |
| Permitted Peak Demand Runtime | 30 minutes |

Based upon a network-enabled smart thermostat receiving an indication as exemplified in Table 1, the network-enabled smart thermostat may precool the structure in which it is installed during the overgeneration event in order to thermally store energy for use later during the defined peak demand event time period. The smart thermostat or a remote-server (e.g., operated by the thermostat service provider) may calculate exactly when and to what temperature precooling of the structure should be performed in order to realize power savings during the peak demand event based on the thermal mass of the structure. A "permitted peak demand runtime" may be indicated, which indicates an amount of time that the air conditioner is permitted to be operated during the peak demand event. By such a time period being defined, the extent to which the structure is precooled can be decreased. Greater precooling would be required to roughly maintain a user's desired temperature for the structure if, for example, the permitted peak demand runtime was specified as zero, which corresponds to no operation of the air conditioner during the peak demand time period.

Figure 6:
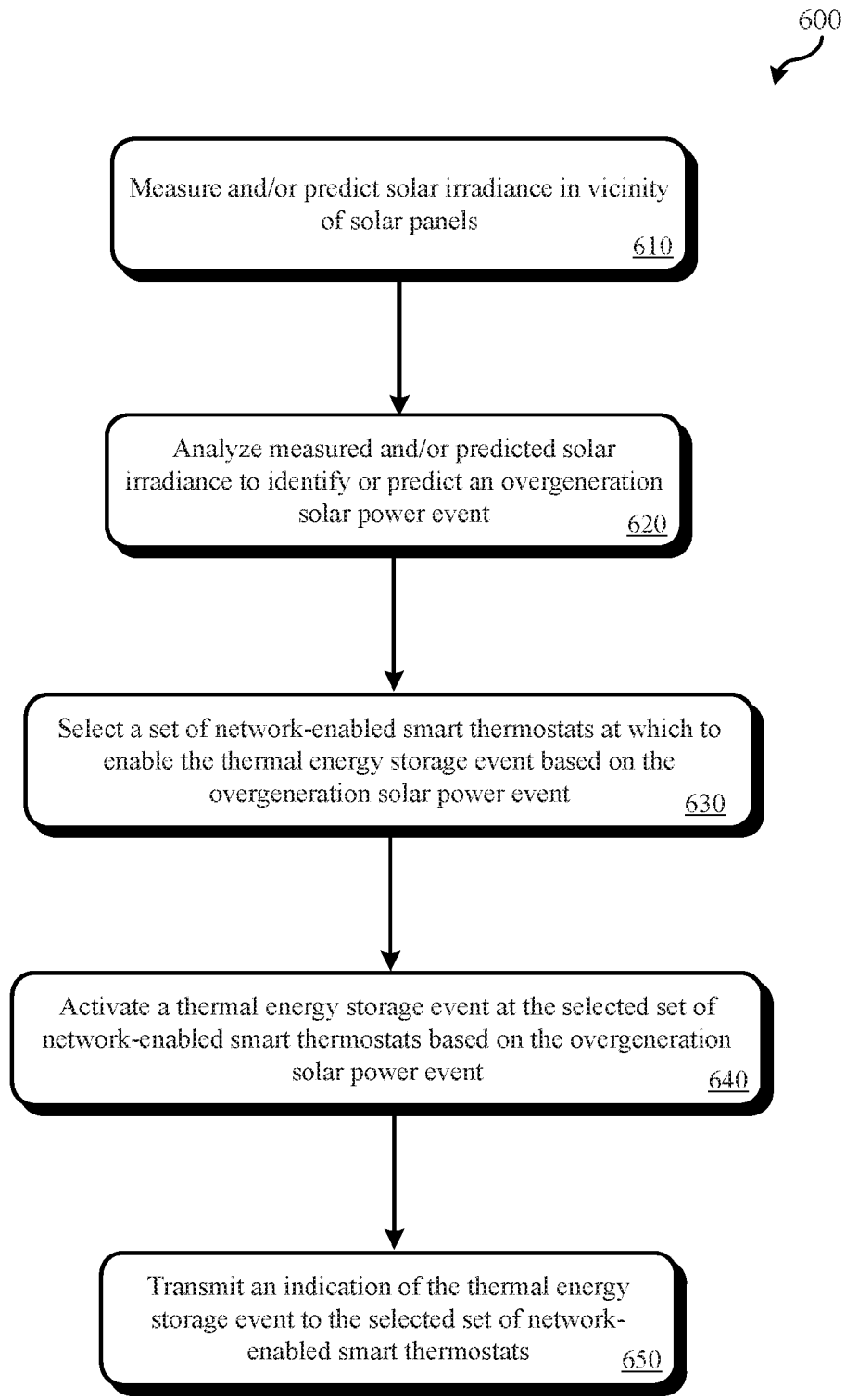
FIG. 6 illustrates another embodiment of a method for using a thermal energy storage system.

FIG. 6 illustrates a method 600 for using a thermal energy storage system. At block 610, an amount of solar irradiance may be measured in the vicinity of the one or more solar panel installations, which may include a solar panel power generation facility and/or distributed solar panels at structures that are connected with the electrical grid. One or more pyranometers (e.g., pyranometers 310) may be used to determine a solar intensity that is currently being received by the solar panel installations. Data from such pyranometers, in combination with weather data, historical data, system operator data, voltage or power measurements from the solar panel installations, and/or the time may be used to determine and/or predict the solar irradiance that will be received by the solar panels that supply the grid with power for a given time period.

At block 620, the measured and/or predicted solar irradiance measured and/or predicted at block 610 is used to predict an overgeneration event. Block 620 may be performed by, for example, solar output evaluator 321, of thermal energy coordination system 220. The overgeneration event may be determined according to equation 1:

$$(\text{Power}_{PeakSolar} + \text{Power}_{Grid}) - \text{Load} = \text{Overgeneration} \qquad \text{Eq. 1}$$

In Equation 1, $\text{Power}_{PeakSolar}$ represents the average amount of power predicted to be generated by solar panel installations connected with the grid during the time period of a peak solar event. $\text{Power}_{Grid}$ represents the average amount of power that is expected to be provided to the grid by the power sources other than the power sources included in Power$_{PeakSolar}$ during the peak solar event. Load represents the expected load on the grid during the peak solar event. Overgeneration represents the amount of power that will be available on the grid during the peak solar event at least primarily due to the increased level of power production by the solar panel installations during the peak solar event. Based on Equation 1, a percentage (e.g., 50%, 75%, 90%, 100%) of Overgeneration may be allocated for use as part of a thermal energy storage event. In some embodiments, at least a portion of the analysis performed at block 620 may be performed by an operator. That is, a person may be presented with measured and/or predicted solar irradiance data and may be permitted to make the ultimate decision as to whether an overgeneration solar power event is present. It should be understood that embodiments of method 600 may also be employed when an overgeneration of energy is not present.

A set of network-enabled smart thermostats at which to enable the thermal energy storage event may be selected at block 630. The selection of the set may be made from a super set of smart thermostats that have been registered to be eligible to participate in thermal energy storage events. Selection of the set of network-enabled smart thermostats may be based on various factors, including: the size of the overgeneration identified at block 620; the load on various sub-grids of the electrical grid (that is, if the load during the solar overgeneration event on a particular sub-grid of the electrical grid is already above or predicted to be above a defined threshold, structures that draw power from that sub-grid may not be eligible to participate); and determined thermal masses of the structures at which the network-enabled smart thermostats are located (e.g., thermal mass may be required to be above a particular threshold thermal mass value in order for the structure and network-enabled smart thermostat to be eligible to participate, or the smart thermostats associated with the highest thermal mass being given preference to participate). It may be desirable to limit an amount of load on particular power substations during a peak demand event. For such a situation, structures that receive power from that substation may be targeted for inclusion in a thermal energy storage event. Conversely, it may be desirable to limit an amount of load on particular power substations during a peak solar event. For such a situation, structures that receive power from that substation may be targeted for exclusion from the thermal energy storage event.

An analysis of which thermostats to include or exclude on a sub-grid level basis may also be useful for providing one or more sub-grids with additional voltage and/or frequency control. The ability to store electrical energy as thermal energy for use at a later time may be leveraged to improve voltage and frequency control on a sub-grid and, therefore, on the grid as a whole.

At block 640, a thermal energy storage event may be activated. The thermal energy storage event may be activated by thermal storage event engine 323 of thermal energy coordination system 220. The thermal energy storage event may be activated based on blocks 610-630. In some embodiments, the thermal energy storage event is only activated if the demand event is predicted to involve greater than a defined threshold. If the peak demand predicted for a day is below a defined threshold demand value, it may not be efficient to activate the thermal energy storage event. Activation at block 640 may include determining a time period during which a peak demand event is likely to occur and predicting the severity of the peak demand event. The greater the expected load during the peak demand event, the greater the aggressiveness of an implemented thermal storage event. Greater aggressiveness may involve increasing the amount of thermal energy stored and the shorter the amount of time that the smart thermostats are permitted to activate the air conditioning during the peak demand event.

Activation at block 640 can include creating messages that include instructions for precooling a structure's interior: 1) ahead of the peak demand event and/or 2) cooling the structure's interior to a lower temperature than requested by a user-defined setpoint. By cooling the structure's interior to a lower temperature, the air conditioner at the structure may be activated less often such that a temperature roughly equal to the user's desired setpoint is still realized during the peak demand event without engaging the air conditioner. By cooling the structure's temperature early, power usage is shifted away from the peak demand event to instead coincide with the peak solar event.

At block 650, an indication of the thermal energy storage event may be transmitted to the set of network-enabled smart thermostats identified at block 630. In accordance with systems 200 and 300 of FIGS. 2 and 3, respectively, the thermal energy coordination system 220 may transmit this indication directly to various smart thermostats. Alternatively, in accordance with FIG. 4, thermal energy coordination system 220 may send the indication of the thermal energy storage event to one or more thermostat service provider systems, which may then format and relay appropriate instructions to network-enabled smart thermostats 250. The indication at block 650 may be a packetized message that includes all or a subset of the data indicated in the example of Table 1. It should also be understood that other embodiments of such an indication of a thermal energy storage event may include additional data types and values.

Figure 7:
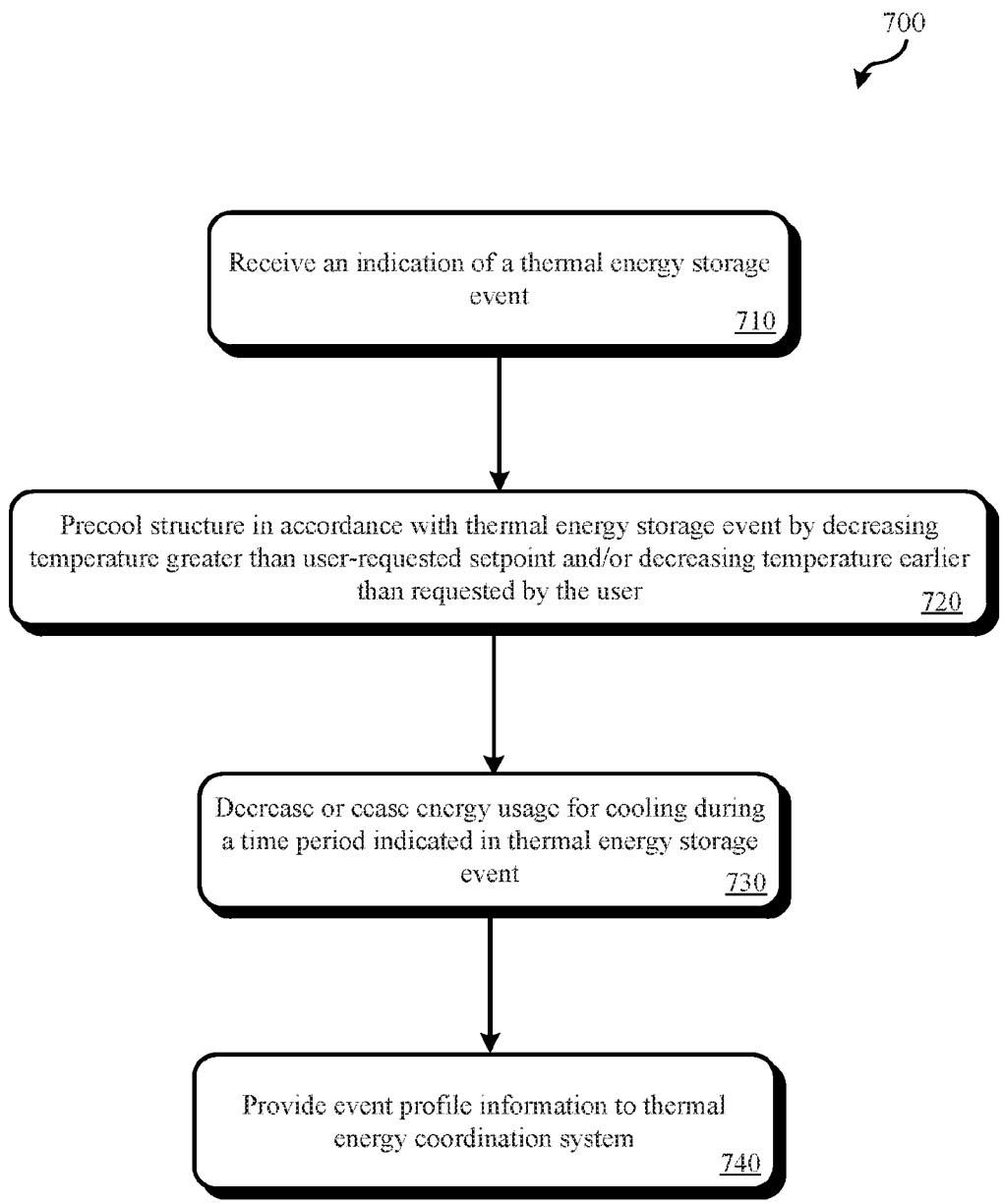
FIG. 7 illustrates an embodiment of a method for a network-enabled smart thermostat to participate as part of a thermal energy storage system.

Various steps related to a thermal energy storage event may be performed by the individual smart thermostats, possibly in combination with a thermostat service provider system. FIG. 7 illustrates an embodiment of a method for a network-enabled smart thermostat to participate as part of a thermal energy storage system. At block 710, a smart thermostat or thermostat service provider system may receive an indication of thermal energy storage event. The indication may be one or more messages, received via the Internet, that includes some or all of the information indicated in Table 1.

At block 720, the network-enabled smart thermostats may precool the structure in which the network-enabled smart thermostats are installed in accordance with the defined thermal energy storage event received at block 710. The smart thermostat may cool the interior of the structure to a temperature significantly below a user's desired setpoint ahead of a peak demand event. Such precooling may occur during a time period defined as a solar overgeneration event and the precooling may be performed to a temperature that will likely result in the interior of the structure being kept within a defined range of degrees during the peak demand event. To determine how much precooling is necessary, the thermal mass of the structure may be used by the network-enabled thermostat or the thermostat service provider system to calculate when precooling should begin and to what temperature precooling should be performed. As an example, if a peak demand event is expected to occur from 7 PM until 8 PM, the overgeneration solar event occurs from 11 AM until 4 PM, and the setpoint at the user's structure calls for the house to be kept cooled to 72 degrees during the 7 PM to 8 PM timeframe, the smart thermostat or the thermostat service provider system may determine that the structure should be called to 65° by 4 PM. By precooling to such a temperature, the structure may be kept relatively close to the user's desired 72° setpoint during the 7 PM to 8 PM timeframe while reducing or eliminating the amount of time during which the air conditioner is required to run during the peak demand event at block 730, thus effectively storing thermal energy for use during the peak demand event. In some embodiments, if the temperature of the structure rises a defined number of degrees above the user's desired setpoint during the peak demand event, the air conditioner may be activated regardless of the thermal energy storage event in effect. In some embodiments, the thermal energy storage event may define a period of time for which the air conditioner is permitted to be run during the peak demand event. Further, in some embodiments, user is permitted to override participation in the thermal energy storage event and force the thermostat and air-conditioning to bring the structure to the user's desired setpoint temperature.

Based on the structure being pre-cooled at block 720 in accordance with the thermal energy storage event, energy usage for cooling during the time period designated as a peak demand event may be decreased or eliminated at block 730. For instance, in some embodiments, the air conditioner may be prohibited from turning on by the smart thermostat due to the contents of the thermal energy storage event indication received at block 710. In some embodiments, the smart thermostat or the thermostat service provider system may monitor the runtime of the air conditioner during the peak demand event. From such information, the effectiveness of the thermal energy storage event at the structure may be assessed. Information regarding: the air conditioning runtime, whether a user override was implemented, the temperature which the structure was pre-cooled, the time at which the structure was precooled, thermal mass measures, and/or performance during the peak demand event may be provided to the thermal energy coordination system following the conclusion of the thermal energy storage event at block 740. Such information may be used to configure future thermal energy storage events and determine which network-enabled smart thermostats should be eligible to participate in such future events.

In order to participate in a thermal energy storage event, a smart thermostat may first need to register to be eligible to participate. Such eligibility may be at least partially determined based on a thermal mass of the structure in which the smart thermostat is installed. That is, it may only be efficient to implement a thermal energy storage event in a well-insulated structure that can effectively maintain a significant temperature differential between an internal and external environment for a sufficient period of time, such as 4 hours. By only making certain structures eligible, such as based on thermal mass, consumers may be encouraged to increase the level of insulation of their home or other structure. Such participation may have certain benefits, such as financial remuneration or discounts on electricity service.

Figure 8:
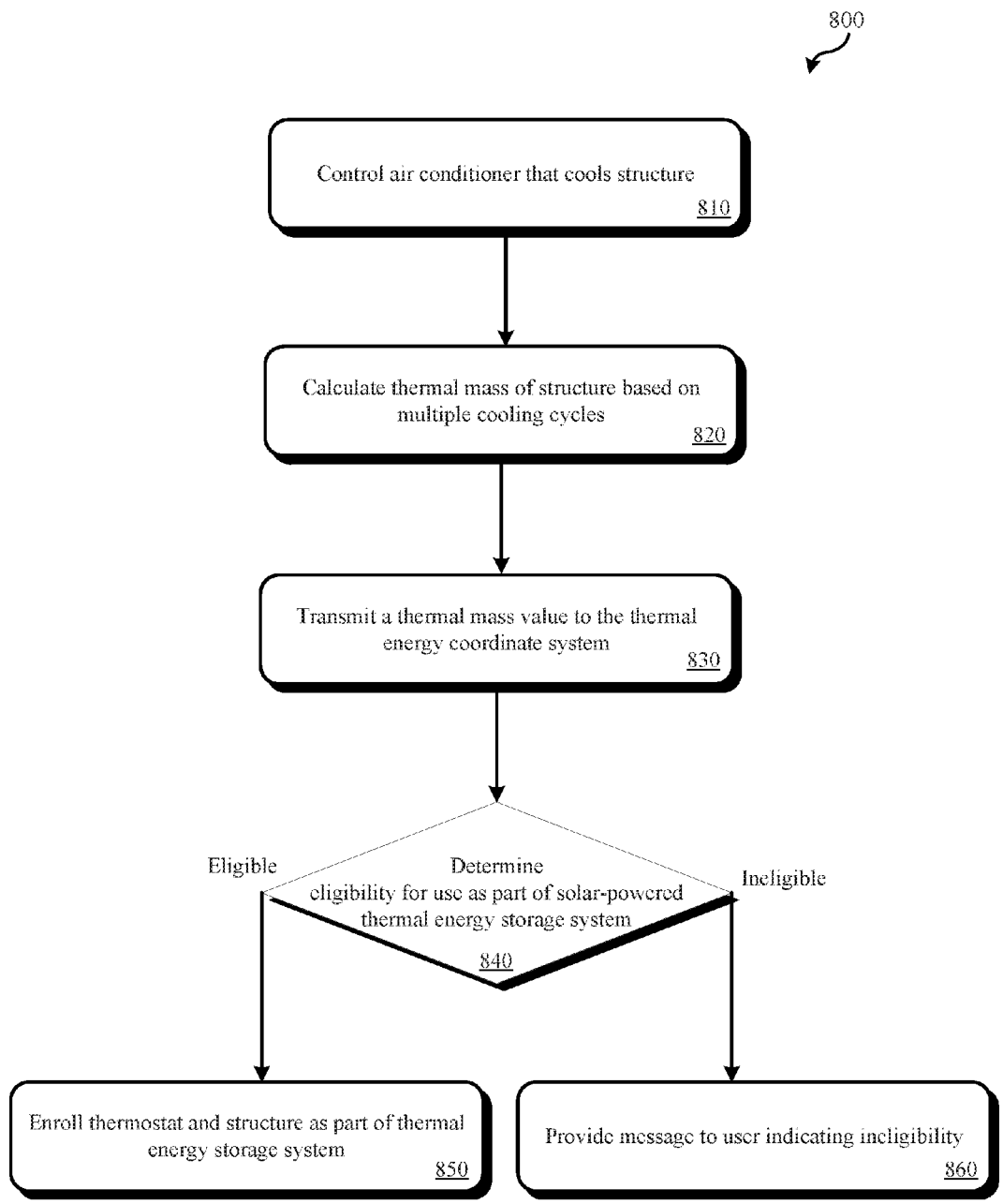
FIG. 8 illustrates an embodiment of a method for registering a network-enabled smart thermostat to participate as part of a thermal energy storage system.

FIG. 8 illustrates an embodiment of a method 800 for registering a network-enabled smart thermostat to participate as part of a thermal energy storage system. At block 810, a smart thermostat may control an air conditioner that cools the interior of the structure. The smart thermostat may track internal measured temperatures of the structure and the runtime of the air conditioner. Such information, in combination with outdoor temperature and/or weather information may be used to determine a thermal mass of the structure. At block 820, the thermal mass of the structure may be calculated based on multiple cooling cycles that were controlled by the smart thermostat at block 810. In some embodiments, the information collected at block 810 may be transmitted to the thermostat service provider or to the thermal energy coordination system for use in calculating the thermal mass of the structure. For example, in some embodiments, thermostat registration engine 322 may be used to register smart thermostats and/or calculate thermal mass of structures based on information received from smart thermostats.

Assuming the thermal mass is calculated at either the smart thermostat or the thermostat service provider, the calculated thermal mass value may be transmitted to the thermal energy coordination system at block 830. In such embodiments, thermostat registration engine 322 may receive the thermal mass value along with an indication of the smart thermostat associated with the value. Thermostat registration engine 322 may also receive or request information about the smart thermostat, such as the location. Such location information may be used to determine which sub-grid of the electrical grid the structure at which the smart thermostat is installed receives power from. Such information may be useful in ensuring that no particular sub-grid of the electrical grid is overloaded during a thermal energy storage event.

At block 840, the eligibility for the structure and the associated smart thermostat to participate as part of the thermal energy storage system may be assessed. In some embodiments, eligibility may be determined by the thermostat registration engine of the thermal energy coordination system based on the thermal mass for the structure being greater than a predefined threshold. In such embodiments, if the thermal mass of the structure is above the threshold, the smart thermostat is eligible to participate. If not, the smart thermostat is ineligible. In other embodiments, eligibility may be based upon the thermal mass value being higher than the thermal mass value of other structures. For instance, only the 10,000 structures with the highest thermal mass values that have applied for eligibility may be permitted in the program. If a smart thermostat is enrolled in the program, a smart thermostat associated with a structure having a lower thermal mass may be removed from the program. In some embodiments, all smart thermostats are eligible; however, structures that have a lower thermal mass may be less likely to be used during a thermal energy storage event. That is, a solar overgeneration event involves a finite amount of electricity being available for use during a thermal energy storage event. This finite amount of electricity may be allocated to invoke the thermal energy storage event at structures having the greatest thermal mass.

If block 840 proceeds to block 850, the smart thermostat and the associated structure is enrolled as part of the thermal energy storage system. The thermal energy coordination system may store an indication of the smart thermostat, such as an IP address, along with an indication of the thermal mass associated with the smart thermostat. As such, the thermal energy coordination system may have access to a list of eligible smart thermostats along with associated thermal masses and may use such associated thermal masses when selecting thermostats to participate in a thermal energy storage event. If block 840 proceeds to block 860, the thermal energy coordination system may provide the user via the smart thermostat (or via some other arrangement, such as via email) an indication as to the current ineligibility to participate in the thermal energy storage system. Such a message of ineligibility may indicate the reason for eligibility, such as the particular sub-grid to which the user's structure is connected has too high of load when overgeneration events typically occur or an indication that the thermal mass of the user's structure is insufficient and, possibly, that if the user improved insulation of the structure, the structure may become eligible to participate and may also be more comfortable for occupants. Additional information may also be provided to an associated user if a structure is found to be ineligible. For instance, a smart thermostat may display information about a person or company that the user can contact about increasing the insulation of his home, such as a private company that specializes in structure insulation or a public entity that helps occupants increase their structure's efficiency. The smart thermostat may also provide the user with an estimate of the cost to add sufficient insulation to qualify for thermal energy storage events. Such an estimate may be based on the minimum thermal mass needed to qualify for the program, the structure's current thermal mass, and costs typically associated with increasing a structure's thermal mass by the amount indicated by the difference between the structure's current thermal mass and the minimum thermal mass needed to qualify to participate in the program. Such information may be provided to the user in ways other than on a display of the smart thermostat. For instance, an email or a letter may be used provide such information.

Figure 9:
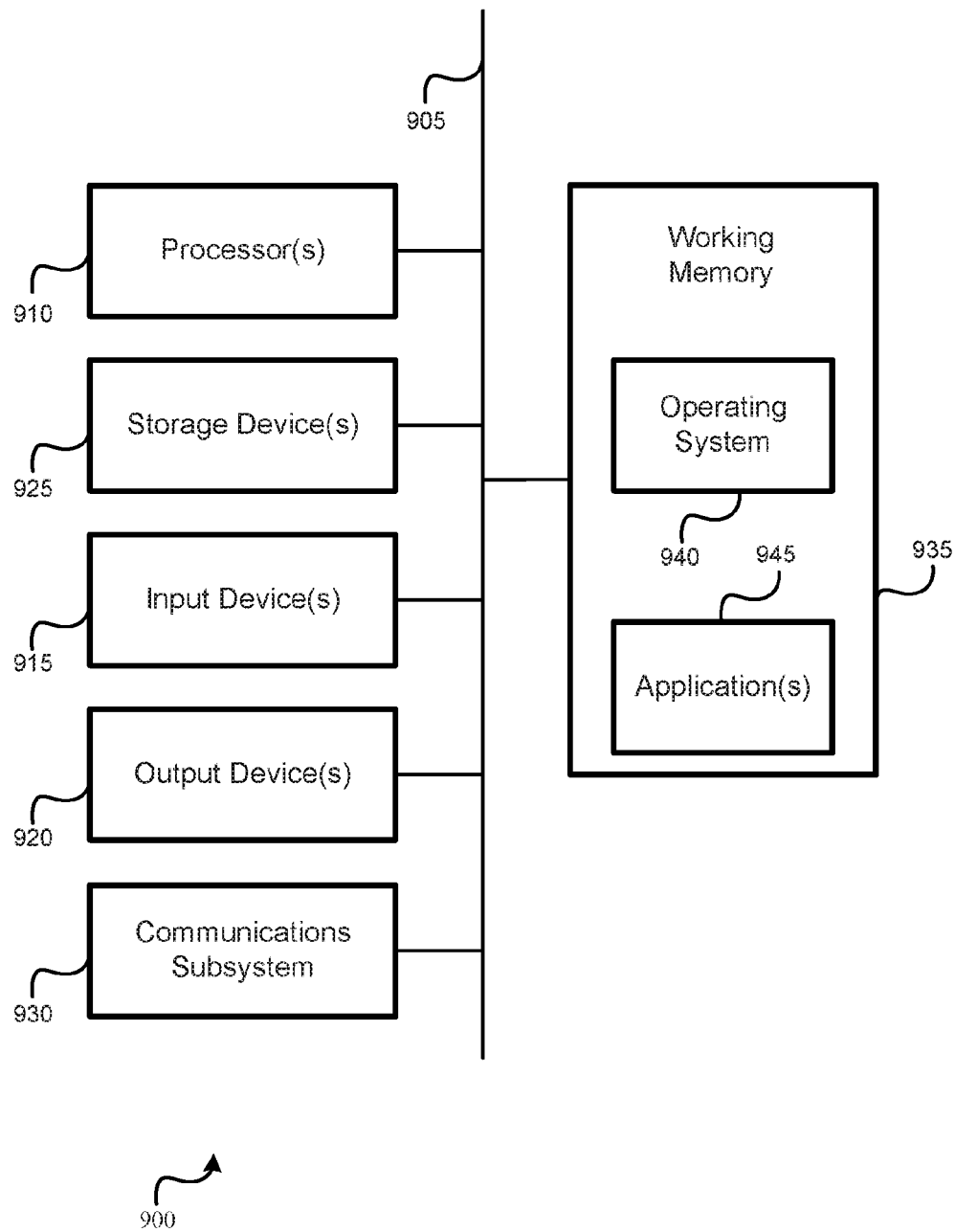
FIG. 9 illustrates a computer system.

A computer system as illustrated in FIG. 9 may be incorporated as part of the previously described computerized devices, such as the thermal energy coordination systems, and the network-enabled smart thermostats. FIG. 9 provides a schematic illustration of one embodiment of a computer system 900 that can perform various steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication). The hardware elements may include one or more processors 910, including without limitation one or more general-purpose processors and/or one or more special-purpose processors (such as digital signal processing chips, graphics acceleration processors, video decoders, and/or the like); one or more input devices 915, which can include without limitation a mouse, a touchscreen, keyboard, remote control, and/or the like; and one or more output devices 920, which can include without limitation a display device, a printer, etc.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should be further understood that the components of computer system 900 can be distributed across a network. For example, some processing may be performed in one location using a first processor while other processing may be performed by another processor remote from the first processor. Other components of computer system 900 may be similarly distributed. As such, computer system 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A thermal energy storage system, comprising:
a plurality of pyranometers, wherein the plurality of pyranometers are physically distributed in a vicinity of a plurality of solar panels, the plurality of pyranometers supplying a thermal energy coordination system with a plurality of solar irradiance measurements;
the thermal energy coordination system, configured to:
receive the plurality of solar irradiance measurements;
analyze the plurality of solar irradiance measurements to predict an overgeneration solar energy event;
activate, to coincide with the overgeneration solar energy event, a thermal energy storage event, the thermal energy storage event defining a time period of the overgeneration solar energy event; and
transmit, to at least a subset of a plurality of network-enabled smart thermostats, the indication of the thermal energy storage event in response to activating the thermal energy storage event; and
the plurality of network-enabled smart thermostats installed at a plurality of structures, wherein each network-enabled smart thermostat of the plurality of network-enabled smart thermostats is configured to:
control an air conditioner within a structure in which the network-enabled smart thermostat is installed based upon a measured temperature and a setpoint temperature;
determine a time to initiate cooling and a temperature to which to cool the structure based upon the time period of the overgeneration solar energy event; and initiate cooling by the air conditioner based on the determined time and the determined temperature in response to the received indication of the thermal energy storage event.

2. The thermal energy storage system of claim 1, wherein the thermal energy coordination system is configured to predict a time period during which the overgeneration solar energy event will occur at least partially based on the plurality of solar irradiance measurements, wherein the indication of the thermal energy storage event indicates the time.

3. The thermal energy storage system of claim 1, wherein electricity generated by the plurality of solar panels are used to directly power air conditioners controlled by the plurality of network-enabled smart thermostats without using a battery charged by one or more solar panels of the plurality of solar panels for storage of the electricity.

4. The thermal energy storage system of claim 1, wherein:
each network-enabled smart thermostat of the plurality of network-enabled smart thermostats are further configured to transmit a thermal mass value to the thermal energy coordination system such that the thermal energy coordination system receives a plurality of thermal mass values from the plurality of network-enabled smart thermostats; and
the thermal energy coordination system is configured to select the subset of the plurality of network-enabled smart thermostats based on the plurality of thermal mass values.

5. The thermal energy storage system of claim 1, wherein:
the thermal energy storage event indicates a time period during which an amount of energy used for cooling by the subset of the plurality of network-enabled smart thermostats is to be decreased; and
each network-enabled smart thermostat of the plurality of network-enabled smart thermostats is configured to: decrease a runtime of the air conditioner controlled by the network-enabled smart thermostat during the time period.

6. The thermal energy storage system of claim 5, wherein each network-enabled smart thermostat of the plurality of network-enabled smart thermostats is further configured to cease activating the air conditioner controlled by the network-enabled smart thermostat during the time period.

7. The thermal energy storage system of claim 1, wherein the plurality of solar panels comprise: a first subset of solar panels located at a grid-level solar facility and a second subset of solar panels that are located at some structures of the plurality of structures.

8. The thermal energy storage system of claim 1, wherein the thermal energy coordination system being configured to activate the thermal energy storage event is based on a difference between electricity generation by the plurality of solar panels and a grid electrical load.

9. The thermal energy storage system of claim 1, wherein the thermal energy coordination system is further configured to:
receive, from each network-enabled smart thermostat of a superset of network-enabled smart thermostats that comprises the plurality of network-enabled smart thermostats, a thermal mass value for the structure at which the network-enabled smart thermostat is installed, such that the thermal energy coordination system receives a plurality of thermal mass values from the superset of network-enabled smart thermostats; and
select the plurality of network-enabled smart thermostats from the superset as eligible to participate as part of the thermal energy storage system based on the received plurality of thermal mass values.

10. A method for using a thermal energy coordination server system, the method comprising:
identifying, by the thermal energy coordination server system, a power overgeneration event that includes power overgeneration due at least in part to power generated by a plurality of solar panels;
predicting, by the thermal energy coordination server system, a peak demand event expected to occur later on a same day as the power overgeneration event;
activating, before or during the power overgeneration event, a thermal energy storage event in response to the power overgeneration event and prediction of the peak demand event expected to occur on the same day; and
transmitting, by the thermal energy coordination server system, to at least a subset of a plurality of network-enabled smart thermostats, an indication of the thermal energy storage event in response to activating the thermal energy storage event, wherein:
the thermal energy storage event comprises an indication of a first time period of the power overgeneration event and an indication a second time period of the peak demand event, and
the first time period is used to store thermal energy until during the second time period.

11. The method for using the thermal energy coordination server system of claim 10, further comprising: determining, by each network-enabled smart thermostat of at least the subset of the plurality of network-enabled smart thermostats, a time to initiate cooling and a temperature to which to cool an associated structure based upon the received indication of the thermal energy storage event.

12. The method for using the thermal energy coordination server system of claim 11, further comprising:
initiating, by each network-enabled smart thermostat of at least the subset of the plurality of network-enabled smart thermostats, using an associated air conditioner, cooling based on the determined time and the determined temperature in response to the received indication of the thermal energy storage event.

13. The method for using the thermal energy coordination server system of claim 10, wherein identifying the power overgeneration event comprises analyzing, by the thermal energy coordination server system, a plurality of solar irradiance measurements to determine the first time period during which the power overgeneration event will occur.

14. The method for using the thermal energy coordination server system of claim 10, further comprising:
receiving, by the thermal energy coordination server system, from each network-enabled smart thermostat of the plurality of network-enabled smart thermostats, a thermal mass value such that the thermal energy coordination server system receives a plurality of thermal mass values from the plurality of network-enabled smart thermostats; and
selecting, by the thermal energy coordination server system, the subset of the plurality of network-enabled smart thermostats based on the plurality of thermal mass values.

15. The method for using the thermal energy coordination server system of claim 10, further comprising: ceasing, by each network-enabled smart thermostat of at least the subset of the plurality of network-enabled smart thermostats, to activate an air conditioner controlled by the network-enabled smart thermostat during the second time period of the peak demand event in response to the received thermal energy storage event.

16. The method for using the thermal energy coordination server system of claim 10, wherein identifying the power overgeneration event comprises determining a difference between a predicted electricity generation amount and a predicted grid electrical load.

17. The method for using the thermal energy coordination server system of claim 10, further comprising:
   receiving, from each network-enabled smart thermostat of a superset of network-enabled smart thermostats, a thermal mass value for a structure at which the network-enabled smart thermostat is installed, such that the thermal energy coordination server system receives a plurality of thermal mass values from the superset of network-enabled smart thermostats; and
   selecting, by the thermal energy coordination server system, the plurality of network-enabled smart thermostats from the superset as eligible to participate as part of the thermal energy coordination server system based on the received plurality of thermal mass values.

18. A non-transitory processor-readable medium comprising processor-readable instructions configured to cause one or more processors to:
   identify a power overgeneration event expected to occur that includes power overgeneration due at least in part to power generated by a plurality of solar panels;
   identify a peak demand event expected to occur later on a same day as the power overgeneration event;
   activate a thermal energy storage event in response to the identified power overgeneration event and the identified peak demand event expected to occur on the same day; and
   transmit to a subset of a plurality of network-enabled smart thermostats, an indication of the thermal energy storage event in response to activating the thermal energy storage event, wherein:
      the thermal energy storage event comprises an indication of a first time period of the power overgeneration event and an indication a second time period of the peak demand event, and
      the first time period is used to store thermal energy until during the second time period.

19. The non-transitory processor-readable medium of claim 18, wherein the processor-readable instructions configured to cause the one or more processors to identify the power overgeneration event comprise processor-readable instructions configured to cause the one or more processors to: analyze a plurality of solar irradiance measurements to determine the first time period during which the power overgeneration event is expected to occur.

20. The non-transitory processor-readable medium of claim 18, wherein the processor-readable instructions are further configured to cause the one or more processors to:
   receive, from each network-enabled smart thermostat of the plurality of network-enabled smart thermostats, a thermal mass value such that a thermal energy coordination system receives a plurality of thermal mass values from the plurality of network-enabled smart thermostats; and
   select the subset of the plurality of network-enabled smart thermostats using the plurality of thermal mass values.

* * * * *